United States Patent [19]

Hook

[11] 3,771,774

[45] Nov. 13, 1973

[54] MIXING DEVICE SUITABLE FOR INCORPORATION IN SCREW EXTRUDERS

[75] Inventor: William George Stephen Hook, Welwyn Garden City, England

[73] Assignee: Imperial Chemical Industries Limited, London, England

[22] Filed: Oct. 1, 1971

[21] Appl. No.: 185,752

[30] Foreign Application Priority Data
Oct. 16, 1970 Great Britain.................. 49,284/70

[52] U.S. Cl................. 259/193, 241/103, 241/118, 425/201
[51] Int. Cl....... B29b 1/08, B02c 15/08, A21c 1/06
[58] Field of Search ..................... 259/6, 25, 26, 45, 259/46, 68, 69, 109, 110, 191, 193, DIG. 30, 11; 425/201; 241/103, 118, 123, 162

[56] References Cited
UNITED STATES PATENTS

| | | | |
|---|---|---|---|
| 1,960,708 | 5/1934 | Loomis........................ | 259/DIG. 30 |
| 2,009,734 | 7/1935 | Hiller et al.............................. | 259/9 |
| 1,269,424 | 6/1918 | Grassi................................. | 241/123 |
| 1,989,586 | 1/1935 | Byers et al.......................... | 241/123 |

FOREIGN PATENTS OR APPLICATIONS
2,535    6/1879    Great Britain...................... 241/123

Primary Examiner—Robert W. Jenkins
Assistant Examiner—Stuart S. Levy
Attorney—Cushman, Darby & Cushman

[57] ABSTRACT

A mixing device through which material may pass under pressure comprising a sleeve, a longitudinally extending core member mounted within the sleeve so as to allow relative rotation of the sleeve and core member, a plurality of channels formed in either the sleeve or the core member comprising a link portion flanked by two side portions and a plurality of idler rollers each located in a channel such that relative rotation of the sleeve and core member during passage of material through the mixer causes a counter-rotation of the idler rollers, wherein one side portion of each channel diverges away from the idler roller located within the channel so as to define a wedge-like gap between the side portion and the roller into which material is forced by the relative rotation of the sleeve and core member.

4 Claims, 5 Drawing Figures

MIXING DEVICE SUITABLE FOR INCORPORATION IN SCREW EXTRUDERS

This invention relates to an improved mixing device and in particular to a mixing device which may be incorporated into the barrel of a screw extruder.

The present invention is particularly useful for mixing pigments and other additives into molten thermoplastic materials. Pages 414 and 415 of the second edition of the book "Polythene" edited by Renfrew and Morgan discuss the suitability of screw extruders as means for mixing pigments and other additives into thermoplastics. The book warns that only if a considerable amount of work is done can good dispersions of additive in polythene be obtained using an ordinary single screw extruder. This is because single screw extruders are not always able to break down the agglomerates of particles of pigment or other additive which are formed either during mixing or during the transport of the pigments or other additives. For example particles of carbon black easily stick together to form loosely bonded agglomerates which appear as black specks when mixed into thermoplastics. If the thermoplastic is subjected to melt shaping such as extrusion to form film, the specks frequently break down unevenly to form streaks or smears. These are very prominent in film made by extrusion. The book suggests that the performance of screw extruders as mixers can be improved by providing in tandem with the screw either arrangements of intermeshing sun and planet wheels or turbine-like arrangements of intermeshing stators and rotors. The sun and planet wheel arrangement is, however, complicated and expensive and turbine-like arrangement does not produce a very good break-down of the agglomerates.

It is an object of the invention described in United Kingdom Pat. No. 1,297,956 to provide a simple mixing device which is capable of effecting a thorough mixing so as to ameliorate the problems caused by agglomerates of pigments or other additives. One embodiment of the invention in United Kingdom Pat. No. 1,297,956 comprises a sleeve in which a longitudinally extending rotatable core member is mounted. Channels are formed in the outer surface of the core member and idler rollers are located in the channels. In operation, material is passed along the radial clearance between the sleeve and the core member whilst the core member is rotated. This rotation of the core member causes a counter-rotation of the idler rollers so that the two rotations produce a combination of shear forces which lead to improved mixing.

It is an object of this invention to bring about a further improvement in mixing by modifying the profile of the channels in which the idler rollers are located.

Accordingly, by this invention we provide a mixing device through which material may pass under pressure comprising a sleeve, a longitudinally extending core member rotatably mounted within the sleeve, a plurality of channels formed in the core member and a plurality of idler rollers each located in a channel such that rotation of the core member during passage of material through the mixer causes a counter-rotation of the idler rollers, wherein one or more of the channels are shaped such that the surface of an idler roller located within the channel together with that portion of the surface of the channel which follows the roller during rotation of the core define a wedge-shaped gap into which material passing through the device is guided during the rotation of the core member.

In a further modification of the mixer, that portion of the surface of the channel which precedes a roller during rotation of the core is terminated by a bezel, rebate or similar profile which has the effect of providing a second gap which this time lies in the path of the roller. There should of course be a radial clearance between all parts of the core member and the sleeve, but it is preferred that that portion of the surface of the channels which follows an idler roller should make a running fit in the sleeve so that it can more effectively act as a rake and guide material flowing through the device into the wedge-shaped gap between this portion of the channel and the idler roller.

Thus, in operation of the mixing device the material to be mixed will enter the device in a direction along the axis of rotation of the core and will be forced through the mixing device along that direction. However, the material will also be urged in a direction transverse to its initial direction of travel because of the relative rotation of the sleeve and the core member. Thus, the material will tend to flow helically through the mixing device. However, during its passage through the mixing device the material will contact the idler rollers thus causing them to rotate and act upon the flow of the material so enhancing the mixing effect.

The material is forced through the mixing device by a high pressure exerted on the material at one side of the device. It is therefore necessary to prevent the idler rollers being forced out of their channels by the high pressure. Conveniently this may be achieved by providing a plate removably secured to the core at the downstream end of the mixing device. This place preferably makes a running fit in the sleeve and is provided with a series of holes around its circumference which allow the material to pass therethrough but prevent the rollers from moving axially under the imposed pressure from the material.

The mixing device of the present invention may be used for mixing any materials which may be forced therethrough under pressure. The device is particularly useful for subjecting liquids, and especially molten thermoplastics to intensive mixing. In our preferred embodiment the mixing device is included as part of an extrusion apparatus and the material is forced through the mixer by the pressures created by the screw of the extruder. This is particularly useful for compounding additives in thermoplastic materials for example polyethylene, polypropylene or polyoxymethylenes. The additive, particularly a solid pigment dispersed in a liquid carrier, may be injected into the barrel of the extruder and the mixture then forced through a mixing device according to this invention.

The present invention is illustrated by the following drawings in which.

Figure 1:
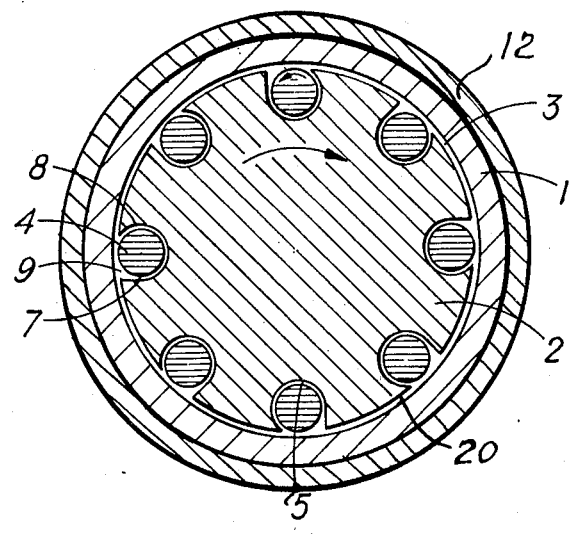
FIG. 1 shows in transverse section a mixing device according to this invention.

FIG. 1 shows a sleeve 1 in which is mounted a rotatable core member 2 leaving a running clearance 3.

Idler rollers 4 are located in channels 5 formed in core member 2. A portion 20 of the surface of member 2 makes a running fit in sleeve 1 and follows idler roller 4 during the rotation of core 2. A portion 8 of the surface of channel 5 precedes idler roller 4 during the rotation of core 2. Portion 7 diverges away from roller 4 so that side portion 7 and the surface of idler roller 4 together define a wedge-like gap 9.

In operation, material is guided into gap 9 by the rotation of core member 2 and in particular the scraping action of portion 7. In gap 9 material is subjected to the kneading action of counter-rotating idler roller 4.

Figure 2:
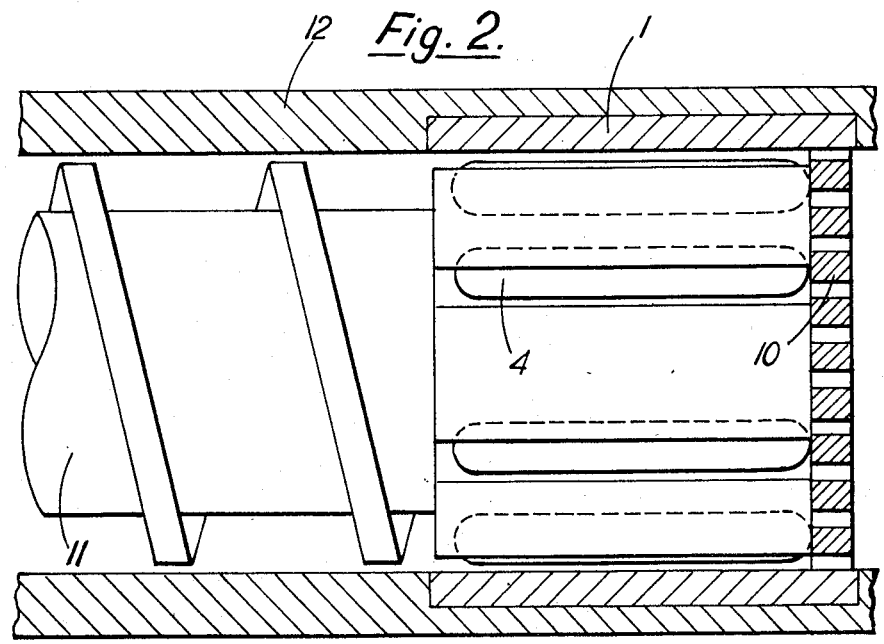
FIG. 2 shows in partial longitudinal section the mixing device illustrated in FIG. 1 where arranged in tandem with the screw of a single screw extruder.

FIG. 2 shows diagrammatically a single screw extruder in which a mixing device according to this invention is arranged in tandem with screw 11 and the whole is located within the barrel 12 of the extruder. Barrel 12 also carries sleeve 1. The idler rollers 4 are retained in their channels 5 by a perforated plate 10 secured to the downstream end of the core member 2.

Figure 3:
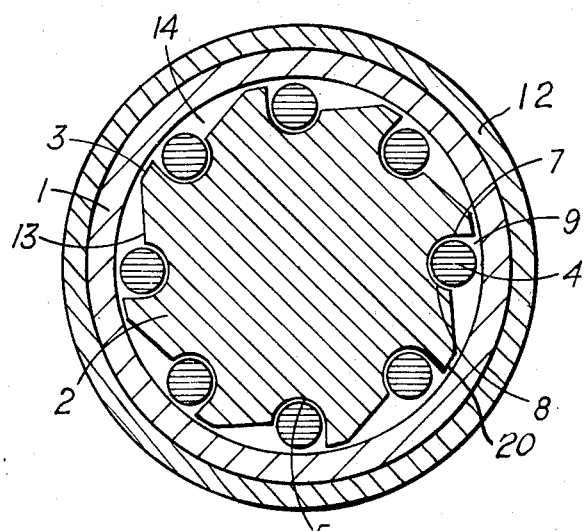
FIGS. 3 and 4 show transverse sections of alternative embodiments of this invention.

FIG. 3 shows a mixing device of the type shown in FIG. 1, but in which portion 8 terminates in a bezel 13 which together with sleeve 1 and roller 4 defines a second gap 14 which lies in the path of roller 4.

Figure 4:
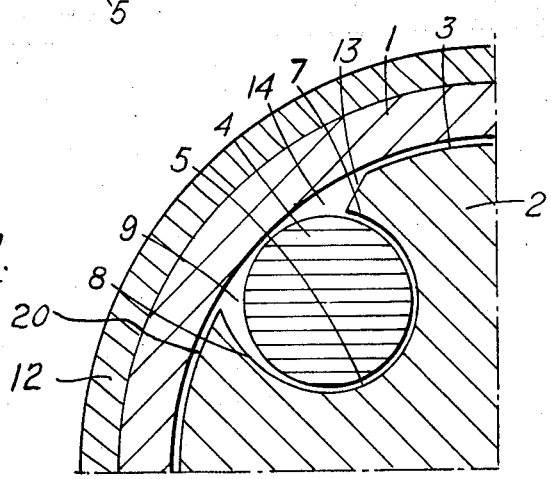

FIG. 4 shows a mixing device in which portion 7 is curved.

Figure 5:
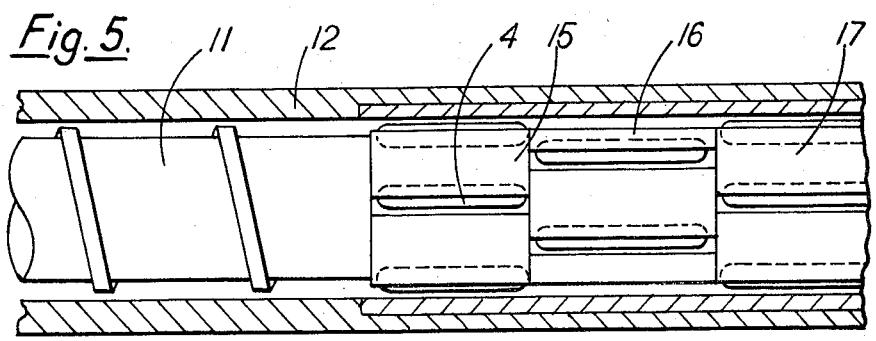
FIG. 5 shows in partial longitudinal section an alternative arrangement to that illustrated in FIG. 2.

FIG. 5 shows a single screw extruder in which three mixing devices 15, 16 and 17 in staggered relation are arranged in tandem with screw 11.

The present invention is also illustrated by the following examples. All melt flow indices quoted were measured according to British Standard 2782:Part 1/105C/1956.

EXAMPLE 1

Masterbatches comprising 80 percent by weight of a conventional low density polyethylene of melt flow index 7 and 20 percent by weight of pigment were made by injecting an aqueous dispersion of the pigment into molten polyethylene and then passing the molten material through the mixing device as described with reference to FIG. 3. The core of the mixing device was rotated at 450 revolutions per minute. The masterbatch so produced was converted to granules and sections 5 microns thick were cut from the granules for examination under a microscope and for comparison with sections obtained according to comparative examples A and B. The pigments used in this example were phthalocyanine green and cadmium yellow. In both cases good dispersions were obtained.

COMPARATIVE EXAMPLE A

Masterbatches were made according to the procedure of Example 1 except that instead of using a mixing device according to this invention, a mixing device as described in British Pat. application No. 25862/69 now United Kingdom Pat. No. 1,297,956 was used. Sections 5 microns thick were obtained as in Example 1.

COMPARATIVE EXAMPLE B

Masterbatches comprising 80 percent by weight of a conventional low density polyethylene of melt flow index 7 and 20 percent of a pigment were made by mixing the polyethylene and the powdered pigment in a Banbury mixer. The resulting masterbatch was converted to granules and sections 5 microns thick were cut from the granules for examination under the microscope.

Comparison of the sections obtained according to Examples 1, A and B under a magnification of 200 times showed that the sections obtained according to Example 1 contained fewer agglomerates than the sections obtained according to either Example A or Example B and that the dispersion obtained in Example 1 was better than that obtained in Example B.

EXAMPLE 2

A masterbatch comprising 95 percent by weight of a polyoxymethylene thermoplastic sold as 'Kematal,' (which is the registered trade mark of Imperial Chemical Industries Limited) and 5 percent by weight of the pigment 'Polymon' Blue, ('Polymon' is also the registered trade mark of Imperial Chemical Industries Limited), was made by injecting an aqueous slurry of 'Polymon' Blue into molten 'Kematal' and then passing the mixture through a mixing device as described with reference to FIG. 3. The core of the mixing device was rotated at a speed of 150 revolutions per minute. The masterbatch was subsequently blended with unpigmented 'Kematal' so as to produce a thermoplastic containing 1 percent by weight of pigment. This blend was injection moulded into plaques from which sections 20 microns thick were cut. The sections were examined using a "Quantimet" (which is the registered trade mark of Metals Research Limited) size analysis technique and it was found that the sections (which amounted to 1 cm$^2$ in area) contained only a few agglomerates. The size and frequency of the agglomerates were as follows:

| Diameter of Agglomerates in $\mu$m. | Number of Agglomerates having diameters in ranges listed in Column 1 |
|---|---|
| less than 5 | 140 |
| 5 to 10 | 32 |
| 10 to 15 | 4 |
| 15 to 20 | 3 |
| 20 to 25 | 2 |
| 25 to 30 | 2 |
| 30 to 35 | 0 |
| 35 to 40 | 0 |
| 40 to 45 | 3 |
| 45 to 50 | 1 |

I claim:

1. A mixing device comprising a cylindrical sleeve through which material may travel in an axial direction under pressure, a longitudinally extending core member rotatably mounted within the sleeve, a plurality of channels formed in the core member and a plurality of idler rollers each located in a channel such that rotation of the core member during passage of material through the mixer causes a counter-rotation of the idler rollers wherein one or more of the channels are shaped such that the surface of an idler roller located within the channel together with that portion of the surface of the channel which follows the roller during rotation of the core member, define a wedge-shaped gap into which material passing through the sleeve is guided during the rotation of the core member and wherein that surface of the core member adjacent and following the portion of the surface of the channel makes a running fit in the sleeve.

2. A mixing device through which material may pass under pressure comprising a sleeve, a longitudinally extending core member rotatably mounted within the sleeve, a plurality of channels formed in the core member and a plurality of idler rollers each located in a channel such that rotation of the core member during passage of material through the mixer causes a counter-rotation of the idler rollers; wherein one or more of the channels are shaped such that the surface of an idler roller located within the channel together with that portion of the surface of the channel which follows the roller during rotation of the core member, define a wedge-shaped gap into which material passing through the device is guided during the rotation of the core member and wherein one or more channels are shaped such that that portion of the channel which precedes an idler roller located in the channel during rotation of the core member terminates in a bezel-shaped profile which provides a gap lying in the path of the idler roller.

3. A combination of two or more mixing devices arranged in tandem and in staggered relation through which material may pass under pressure, each mixing device comprising a sleeve, a longitudinally extending core member rotatably mounted within the sleeve, a plurality of channels formed in the core member and a plurality of idler rollers each located in a channel such that rotation of the core member during passage of material through the mixer causes a counter-rotation of the idler rollers and wherein one or more of the channels are shaped such that the surface of an idler roller located within the channel together with that portion of the surface of the channel which follows the roller during rotation of the core member, define a wedge-shaped gap into which material passing through the device is guided during the rotation of the core member.

4. A combination of two or more mixing devices as claimed in claim 2 wherein the mixing devices are arranged in tandem and in staggered relation.

* * * * *